Jan. 20, 1931.  H. W. SKIDMORE ET AL  1,789,846
METHOD AND APPARATUS FOR TESTING BITUMINOUS MIXTURES
Filed March 5, 1928   3 Sheets-Sheet 1

Jan. 20, 1931.  H. W. SKIDMORE ET AL  1,789,846
METHOD AND APPARATUS FOR TESTING BITUMINOUS MIXTURES
Filed March 5, 1928  3 Sheets-Sheet 3

Witness:

Inventors:
Hugh W. Skidmore,
Gene Abson.
By Frank L. Belknap
Atty.

Patented Jan. 20, 1931

1,789,846

UNITED STATES PATENT OFFICE

HUGH W. SKIDMORE AND GENE ABSON, OF CHICAGO, ILLINOIS, ASSIGNORS TO CHICAGO PAVING LABORATORY, INC., OF CHICAGO, ILLINOIS, A CORPORATION OF ILLINOIS

METHOD AND APPARATUS FOR TESTING BITUMINOUS MIXTURES

Application filed March 5, 1928. Serial No. 259,051.

The present invention relates more particularly to a method and apparatus especially adapted for testing bituminous mixtures for the determination of certain characteristics found most desirable in their use as street paving, floor coverings, or the like.

It is an object of the present invention to provide a method and apparatus by which accurate informative shear resistance tests of such mixtures may be made.

The art of testing bituminous materials at the present date has advanced to the point where it is possible to correlate laboratory results of properties of component materials with actual service requirements, but there heretofore has been no means of testing finished bituminous mixtures which would be measurable with actual usage. For instance, in the art of preparing street paving, flooring or mastic mixtures, the paucity of information relative to the physical characteristics of such completed structures is such that only actual service over a period of years can be relied upon to show the characteristic differences in serviceability or value between various mixtures. Obviously, such experimentation is too slow and oftentimes costly. With this in mind, the apparatus and methods of this invention were conceived after exhaustive research in the field of such mixtures.

With particular reference to street paving mixtures, investigation has shown that the major defect which might be encountered under service was that of displacement or distortion, commonly known as "rolling," "shoving," or "rutting", and that all such defects were manifestations of the same mechanical forces though brought about by variable conditions of traffic; and that most of such displacement occurred during periods of highest temperatures. Since such distorting forces of traffic, when studied, proved to be mainly those of shearing action, it was found that a measure of the shear resisting ability of an asphaltic mixture at approximately maximum subjected temperature would be a measure of its stability under traffic. Extensive research has shown this to be true, and pavements of high shear strength when tested in accordance with this invention have demonstrated their stability under the densest traffic known.

In addition, the insight into the mechanics of bituminous street paving mixtures gained by the knowledge evolved from shear strength tests has been the source of profound changes and improvements in such mixtures. Formerly, it was a universal belief that hard asphalt was an essential to resistance to distortion under heavy traffic with its consequent disadvantage of cracking owing to its brittleness. But the shear test has shown that this resort to hard asphalt was entirely fallacious, and that by proper and judicious selection of component materials, designed to develop a maximum of shear strength, such defects have been eliminated.

We know that, in the past, several methods of testing bituminous mixtures have been advanced, but none of these approach any fundamental factor which could be of any practical consideration. In all of these tests, analysis of the methods used shows that the forces usually measured have been a combination of compression, tensile strength, compound shear, penetration and the like, all together. The result has been that fictitious values have been placed upon mixtures which past experience has shown were doomed to failure, or previously known satisfactory mixtures were catalogued as inferior. In short, the above tests were of no value in predicting the service which might have been expected from a given mixture.

In shear testing, the important factors are careful preparation of uniform specimens of proper dimensions, and for this purpose cylinders of varying diameters from 1" to 4" or more, may be used, the size being dependent upon the diameters of the aggregates used. Another important factor in obtaining informative results is the rate at which the force for shearing is applied. With the apparatus of the present invention, the rate of application can be controlled at will by regulation of the gears or speed of revolution of the actuating mechanism. The temperature at which bituminous mixtures are tested, is always of paramount importance as all bitumens are gradually rendered more and more plastic with increasing temperature. In this apparatus, the temperature of course, can be controlled at will, since the test specimens and base of the machine are immersed in water, or other suitable liquid which is carefully regulated as to temperature.

The method of testing which forms the basis of the present invention may comprise first the formation of the material or mixture to be tested, into cylinders of a uniform diameter, preferably by molding while in a plastic condition. Thus the mixtures may be "set" under conditions of temperature and pressure similar to those under which they are applied in commercial usage as paving, etc. These cylindrical samples are then maintained at a predetermined temperature while being subjected to an increasing shearing force until the sample is sheared, the shearing force being increased at a predetermined rate. The force required to shear the sample indicates the shear resistance of the material tested and constitutes the basis of comparison of the shear resistant qualities of the material tested with the same qualities of other materials which have been so tested. Cylinders may be cut from pavements of known quality or inferiority, and compared for study.

It is a further object of the present invention to provide an apparatus especially adapted to carry out the above described method of testing.

The apparatus briefly described, comprises a suitable frame, the lower portion of which may be immersed in water or other liquid, having mounted on its lower portion a shearing means adapted to shear the material to be tested, comprising a stationary die having an aperture adapted to receive the material to be tested, and a movable die adjacent thereto also having an aperture adapted to receive the material to be tested, the aperture of the latter die being further adapted to correspond to, and be aligned with, the aperture in said first mentioned die. A means is provided to actuate the movable die to cause the cylinder being tested to be subjected to an increasing shearing force, comprising a series of elements connected to the movable die adapted to be actuated upon the rotation of a threaded shaft associated with said elements. An indicating device is interposed in said series of elements to indicate the amount, and rate, of force applied to the said movable die.

In the drawings, Fig. 1 is a rear elevational view of the apparatus of the present invention.

Fig. 5 is a fragmentary cross sectional view taken on line 5—5 of Fig. 2.

Figs. 6 and 7 are perspective views of removable bushings to adapt the dies to receive smaller samples of material to be tested.

Figure 1:
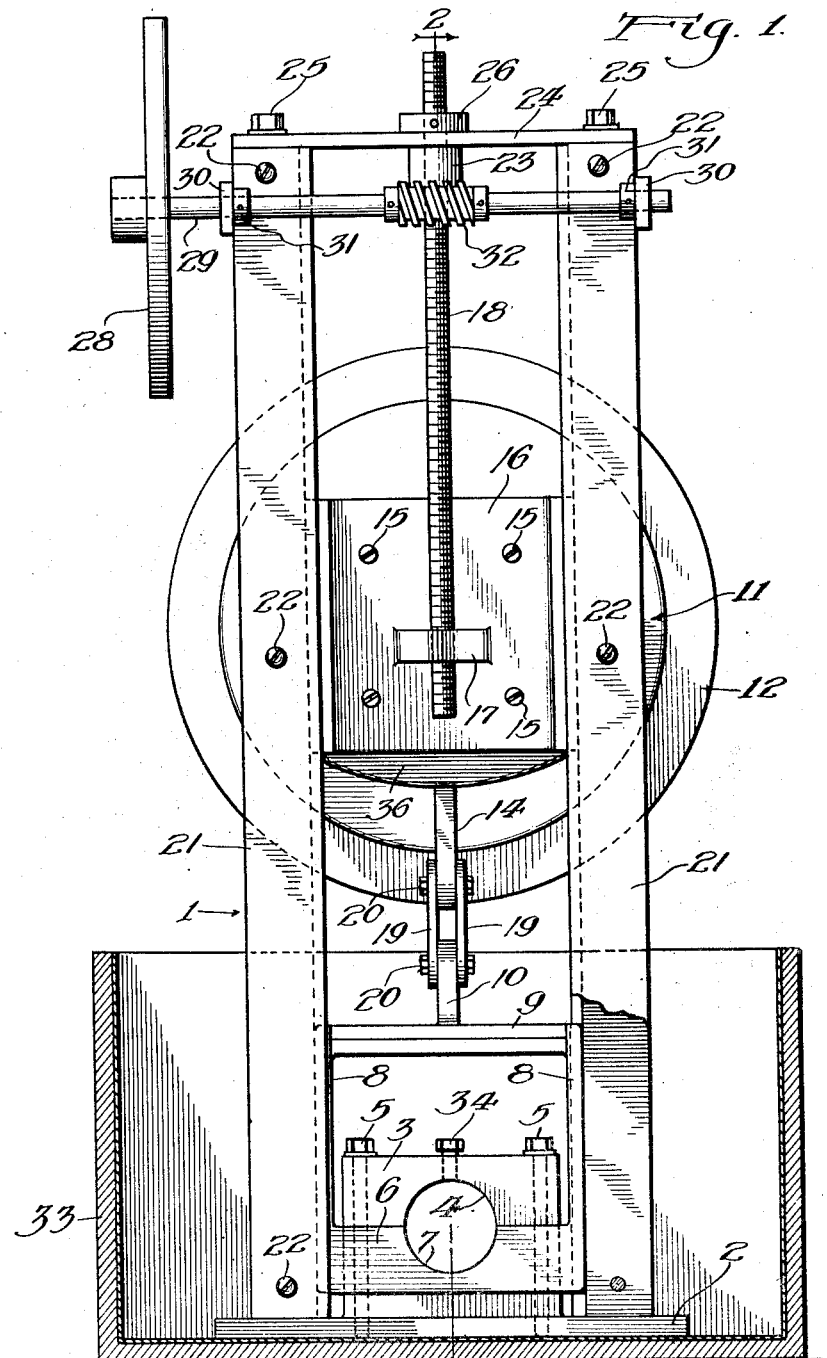
Figure 2:
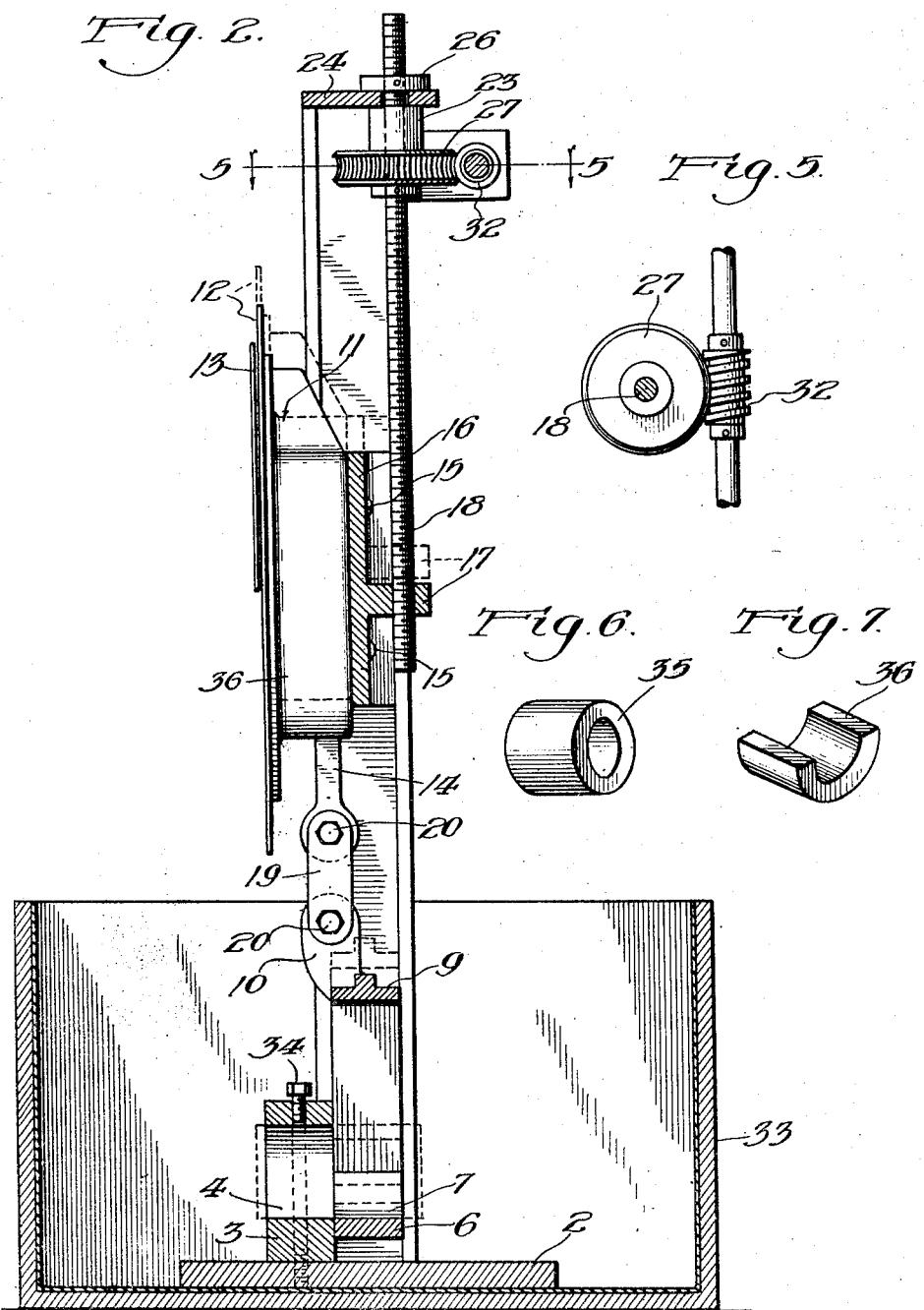
Fig. 2 is a vertical sectional view taken on line 2—2 of Fig. 1.

Referring more in detail to the drawings, 1, 1 designate spaced parallel uprights mounted upon the base 2. A stationary die 3 having an enclosed circular aperture 4 may be secured to the base 2 by means of the bolts 5, and may be positioned between the frame members 1, preferably equi-distant from each. A movable die 6 having a semi-circular aperture 7 in its upper edge, and guide members 8 integrally or otherwise attached to opposite lateral edges, may be provided, the said guide members 8 being adapted to contact the inner walls of the frame members 1 to permit movable die 6 to slide upwardly and downwardly therebetween. The semi-circular aperture 7 in the movable die 6 may have a radius corresponding to the radius of the circular aperture 4 in the stationary die 3 and is adapted to align itself with the latter aperture when movable die 6 is in its lowermost position. The latter may thus be guided by the members 1 whereby it moves within a plane adjacent to the plane of the die 3. A cross bar 9 having an upwardly extending lug 10 may integrally or otherwise, connect said guide members 8.

Figure 4:
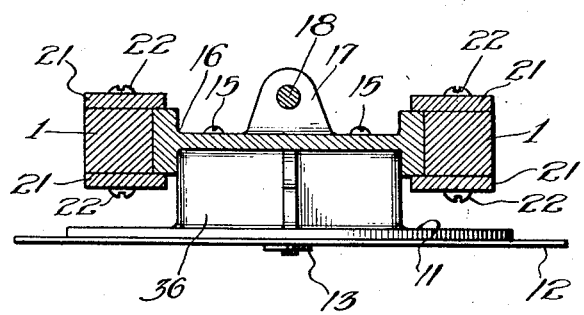
Fig. 4 is a cross sectional view taken on line 4—4 of Fig. 3.

A suitable indicating device 11 having a graduated dial 12, an indicating hand 13, and a rod 14 to which the weight or force may be applied, may be secured by means of the screws 15 to a block 16. The block 16 may be adapted to slide between the two upright members 1 and may have a projecting ear 17 adapted to have threaded engagement with a threaded shaft 18. The rod 14 may be connected to the lug 10 by means of connecting links 19, the latter being secured by means of the pins or bolts 20. Suitable plates 21 (Fig. 4) adapted to extend beyond the inner side of the upright members 1 may be fixedly secured to the latter by means of the screws 22, to provide a groove or track in which the elements 8 and the block 16 may slide, assuring their constant engagement with the said members 1. The shaft 18 may be journaled in a bearing 23 which may in turn be mounted in a cross bar member 24, the latter in turn being secured to the upper ends of the upright members 1, by means of the bolts 25. A collar 26 may be secured to the shaft 18 and may in turn bear against the cross bar member 24, whereby the shaft 18 will be supported against any downward pull exerted upon the latter. A worm gear 27 may be keyed or otherwise suitably attached, to the shaft 18.

A wheel 28, adapted to be turned by hand or other power, may be keyed, or otherwise suitably attached, to a shaft 29, the latter in turn being journaled in suitable supports 30 which in turn may be mounted upon the frame supports 1. One or more collars 31 may be mounted upon the shaft 29 to maintain the latter in proper alignment. A worm 32 may be keyed, or otherwise suitably attached, to the shaft 29 and may be engaged with the worm gear 27 mounted on shaft 18, whereby upon rotation of the wheel 28, the shaft 18 will be rotated. Thus, by regulating the speed of rotation of the wheel 28, the rate of increase of the force applied to the die 6 may be determined, as the speed with which the block 16 is raised by the threaded shaft 18, varies directly with the speed of rotation of the said shaft 18. Also by proper gear interchange, the speed with which the block 16 is raised, may be reduced or increased.

Figure 3:
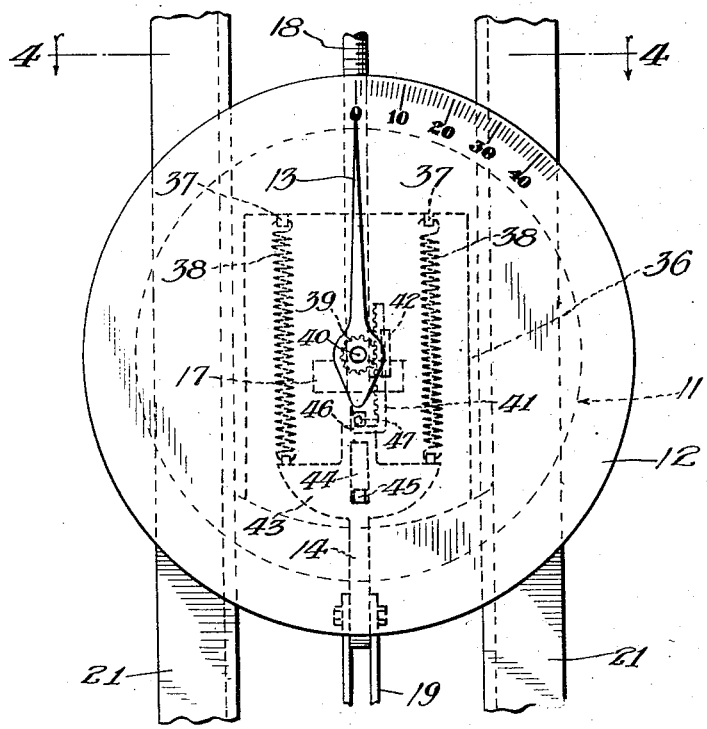
Fig. 3 is a fragmentary front elevational view of the indicating device.

The construction of the indicating device 11 may be as follows: a suitable frame 36 may be provided having lugs 37 adapted to engage one or more coiled springs 38. A pinion gear 39 may be keyed to a shaft 40, the latter being journaled in the frame 36 and the dial 12, and having the indicator 13 keyed to it. A rack 41 adapted to mesh with the pinion gear 39 may be slidably mounted in the guides 42. The rod 14, may be integrally connected to a T shaped member 43 having an elongated slot 44 adapted to engage a square lug 45. The spring 38 may be connected to the said T shaped member 43 in the manner illustrated in Fig. 3. The lower end of rack 41 may be hookshaped as shown at 46 to engage a pin 47 carried by the member 43. Thus, as the scale 11 is moved upwardly through rotation of the handle 26, it carries with it the frame 36, dial 12, pinion 39, shaft 40 and hand 13, the pinion 39 being in mesh with the rack 41 will rotate, causing the shaft 40 and the hand 13 to move around the face of the dial. The frame 36 will be pulled against the tension of the springs 38, the members 43 and 14 remaining substantially stationary. When the material is sheared, the projection 14 and member 43 with associated elements will move upwardly under the influence of spring 38, the pin 47 being disengaged from the hook 46 so that the rack pinion and indicator 13 remain in their maximum position. The maximum amount of force necessary to shear the sample will thereby be indicated, the indicator 13 remaining in fixed position after shearing until notation has been made of it and it is moved manually back to the zero position, at which time the shaft 40 will also be rotated, carrying with it the pinion 39 which causes upward movement of the rack 41 until the hook 46 engages the pin 47. The handle 28 is thereupon rotated to restore the various elements to normal position.

The entire apparatus described above, may be mounted in a container 33 of a depth sufficient to permit the material, which is to be tested, to be immersed in the water or other liquid which may be placed therein. Air or other gas may be substituted for water or other liquid. Thus, the material to be tested may be easily maintained at a predetermined temperature by controlling the temperature bath.

The material may be tested substantially as follows: The bituminous materials may be heated to a degree of temperature which will render them sufficiently plastic to be molded into cylinders of a predetermined diameter, say 1 to 4 inches, more or less, the size being dependent upon the diameters of the aggregates used. For example, a one or two inch cylinder is satisfactory for sand mixtures with one-tenth of an inch as the maximum size aggregate.

With stone mixtures, cylinders of larger diameter may be used. The cylinder is molded under a predetermined amount of pressure and at a predetermined temperature, both corresponding, if desired, to the conditions of temperature and pressure under which the material is to be applied commercially. The cylinder thus formed, is then put into the opening 4, in the stationary die 3, a bushing 35 as shown in Fig. 6 being used if necessary to cause the cylinder of material to be tested, to fit snugly into the opening 4 in the die 3, the set screw 34 being employed if necessary, to secure the said bushing 35 in place. The remainder of the cylinder of material to be tested may extend into the opening 7 of the movable die 6, a bushing 36 similar to that shown in Fig. 7 being used, if necessary, to cause a snug fitting of the material in the die 6.

The tank 33 may be filled with a quantity of water or other liquid, to a height sufficient to cover the material to be tested. In practice it has been found most expedient to place a thermometer (not shown) in the liquid to determine its temperature and also immerse in the liquid a conventional electric heating element to heat the said liquid to the temperature desired. This temperature may correspond, if desired, to the temperature to which the material may be subjected in actual use. Upon the temperature reaching the desired point, the wheel 28 is rotated at a predetermined speed causing the shaft 18 to turn whereby the scale 11 will be moved in an upward direction. This upward pull is in turn exerted upon the rod 14, the couplings 19, lug 10, cross bar 9, guide members 8, and die 6, the die 6 being raised until it presses against the cylinder of material to be tested. As the wheel 28 is further revolved, the scale 11 is slowly but steadily raised, as heretofore described, the increasing force being in turn exerted upon the rod 14 which is held substantially stationary by the die 6 bearing against the cylinder of material.

When sufficient pressure is exerted upon the cylinder of material, it will be sheared apart at a point between the dies 3 and 6. When this occurs, the force exerted upon the mechanism is relieved, the indicator 13 remaining in a position indicating the maximum shearing force exerted upon the said cylinder of material.

It is to be understood that the material to be tested may be of shapes other than cylindrical. It will be evident to those conversant with the art, that the rate of application of the shear force is an important factor in order to determine the resistance of mixtures to the conditions to be encountered by it in actual use. Thus a pavement is subjected to various kinds of shearing forces caused by the traffic. The forces range from a quickly applied force, to a constantly applied force for an extended period of time, all occurring under varying conditions of temperature. An example of the more quickly applied forces are those caused by an accelerating high powered automobile, or the sudden application of the brakes of a heavy automobile or truck.

An example of constant forces over an extended period of time are those set up by a parked heavy automobile or truck.

It is also to be understood that the inventive scope of the present device is not to be limited to the type of scale or indicator 11 herein described, the particular type of scale 11 being herein described in detail for the purpose of showing an operable type of structure, the use of any type of scale or other suitable indicating device being contemplated in connection with the above described testing machine.

We claim as our invention:

1. In an apparatus for determining the shear resistant qualities of bituminous mixtures, the combination with a frame, of a shearing means adapted to shear the material to be tested, and means for actuating said shearing means, said actuating means being adapted to apply at a predetermined rate the shearing force exerted by the said shearing means upon the material to be tested.

2. In an apparatus for determining the the shear resistant qualities of bituminous mixtures, the combination with a frame, of a shearing means adapted to shear the material to be tested, means for actuating said shearing means, an indicating means cooperatively associated with said actuating means adapted to register the force applied to said shearing means, said actuating means being adapted to apply at a predetermined rate the shearing force exerted by said shearing means upon the material to be tested.

3. In an apparatus for determining the shear resistant qualities of bituminous mixtures, the combination with a frame, of a shearing means adapted to shear the material to be tested comprising a movable die, and means for actuating said movable die, said actuating means being adapted to apply at a predetermined rate the shearing force exerted by the said shearing means upon the material to be tested.

4. In an apparatus for determining the shear resistant qualities of bituminous mixtures, the combination with a frame, of a shearing means adapted to shear the material to be tested comprising a stationary die and a movable die adjacent thereto, and means for actuating said movable die, said actuating means being adapted to apply at a predetermined rate the shearing force exerted by the said shearing means upon the material to be tested.

5. In an apparatus for determining the shear resistant qualities of bituminous mixtures, the combination with a frame, of a shearing means adapted to shear the material to be tested, means for actuating said shearing means, and means associated with said frame for immersing the material to be tested in a temperature bath, said actuating means being adapted to apply at a predetermined rate the shearing force exerted by the said shearing means upon the material to be tested.

6. In an apparatus for determining the shear resistant qualities of bituminous mixtures, the combination with a frame, of a shearing means comprising a stationary die adapted to hold a cylinder to be tested, a movable die adjacent thereto provided with means for receiving a portion of said cylinder to be tested, means for actuating said movable die comprising a screw threaded shaft, and an indicator cooperatively associated with said threaded shaft and said movable die adapted to register the shearing force.

7. In an apparatus for determining the shear resistant qualities of bituminous mixtures, the combination with a frame, of a shearing means comprising a stationary die adapted to hold a cylinder to be tested, a movable die adjacent thereto provided with means for receiving a portion of said cylinder to be tested, means for actuating said movable die comprising a screw threaded shaft, and an indicator cooperatively associated with said threaded shaft and said movable die, and a container surrounding said dies adapted to maintain predetermined temperature conditions relative to said material.

8. A method of determining the shear resistant qualities of bituminous mixtures which comprises forming to a predetermined size and shape under predetermined temperature and pressure the material to be tested, then subjecting said material, while being maintained at a predetermined temperature, to a shearing force, said shearing force being applied to said material at a predetermined rate of application until said material is sheared.

HUGH W. SKIDMORE.
GENE ABSON.